United States Patent [19]

Auerswald et al.

[11] Patent Number: 5,124,362
[45] Date of Patent: Jun. 23, 1992

[54] METHOD FOR REMOVING ORGANIC FOULANTS FROM ANION EXCHANGE RESIN

[76] Inventors: David C. Auerswald, 908 Firmona Ave., Redondo Beach, Calif. 90278; Frances M. Cutler, 17701 Anglin La., Tustin, Calif. 92680

[21] Appl. No.: 14,797

[22] Filed: Feb. 13, 1987

[51] Int. Cl.$^5$ ............................ C08J 5/20; B01J 49/00
[52] U.S. Cl. ........................................ 521/26; 210/670
[58] Field of Search ............................................ 521/26

[56] References Cited

U.S. PATENT DOCUMENTS 4,511,675  4/1985  Auerswald ............................. 521/26
4,511,676  4/1985  Plichgott et al. ..................... 521/26
4,652,352  3/1987  Saieva ................................... 54/26

OTHER PUBLICATIONS

Demineralization By Ion Exchanger In Water Treatment And Chemical Processing Of Other Liquids, S. Applebaum, Academic Press, N.Y. and London (1968).

Primary Examiner—Thurman K. Page
Assistant Examiner—Peter F. Kulkosky
Attorney, Agent, or Firm—Jeffrey G. Sheldon

[57] ABSTRACT

A method for removing organic foulants such as organic sulfonates from an anion exchange resin comprises treating the anion exchange resin at an elevated temperature with a defouling solution containing at least 6% ammonium sulfate (wt/wt sulfate). The method is useful for removing organic foulants from the anion exchange resin used for polishing condensate water in power plants.

18 Claims, 1 Drawing Sheet

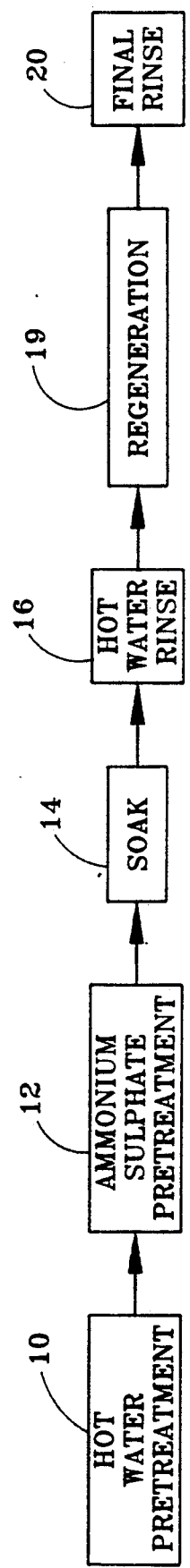

METHOD FOR REMOVING ORGANIC FOULANTS FROM ANION EXCHANGE RESIN

BACKGROUND

The present invention is directed to a process for removing organic foulants from anion exchange resins, such as resin used for polishing condensate water in steam turbine power plant systems.

In many applications, such as for example in steam turbine power plant systems, anion exchange resins and cation exchange resins are used in a polishing system to remove anionic and cationic impurities such as sodium, calcium, magnesium, sulfate and chloride ions from the water. If not removed, these solid forming precursors can produce corrosion within the turbine, boiler and preboiler systems. The exchange resins are used for removing these precursors from both makeup water and condensate water.

The anion exchange resin can be fouled by organic impurities, including organic sulfonates. It is believed that the source of the organic sulfonates is cation exchange resin or organic contaminants left in the cation exchange resin during its manufacture. Organic sulfonate fouling greatly shortens the life of the anion exchange resin.

A brine process has been developed for removing organic foulants from the anion exchange resin used for makeup water. According to this process, as described by Samuel B. Applebaum, *Demineralization By Ion Exchange*, Academic Press, New York (1968), pages 159-60, the resin is treated with a caustic soda and sodium chloride solution. However, there are difficulties with this brine process. For example, in a typical power plant, there is no convenient source of the sodium chloride solution. Further, this process totally exhausts the resin, which necessitates the expense of having to regenerate the resin with high dosages of chemicals. The resin is exhausted because the cation exchange resin is put in the sodium form and the anion exchange resin is put in the chloride form. Sodium cation resin and chloride form anion resin are difficult to regenerate sufficiently to use for pure water production. Moreover, the organic contamination recently encountered is in the form of organic sulfonates, and it is not known whether the brine process is effective for organic sulfonates. A further problem with the brine process is that it is not useful for removing organic foulants from the anion exchange resin used to polish condensate water because of the cost and inconvenience of the process as well as the cost of adequately regenerating the resin.

Thus, when anion exchange resin used for polishing condensate water becomes fouled with organic foulants, typically the resin is discarded. Fouling of the anion resin can occur in less than six months. Discarding the resin is very expensive since the resin can cost as much or more than $200 per cubic foot. For a typical fossil fuel power generating plant there are two to three anion exchange resin beds, each containing 50 cubic feet ($20,000 worth of resin. For a nuclear power plant, there can be as many as six beds, each containing in excess of 200 cubic feet ($240,000 worth of resin).

Thus, there is a need for an economical process for removing organic foulants from anion exchange resin, and particularly the anion exchange resin used to polish condensate water in a power plant.

SUMMARY

The present invention satisfies this need. In a process according to the present invention, organic foulants such as organic sulfonates are removed from anion exchange resin by treating the resin with a defouling solution containing at least 6% ammonium sulfate (wt/wt sulfate). An exemplary defouling solution contains from about 6% to about 15% ammonium sulfate (wt/wt sulfate). In order to avoid (a) polymerizing contaminants present in the anion exchange resin and (b) destroying strong base sites on the resin, the defouling solution preferably has a pH of about 4 to about 10. To avoid osmotic shock, the pH of the anion exchange resin is preferably from about 7 to about 10 and, optimally, from about 9 to about 10.

Preferably the anion resin is treated with the defouling solution by initially treating the resin with a solution of reduced strength containing less than 6% ammonium sulfate (wt/wt sulfate), such as less than 3%. Then the ammonium sulfate content of the defouling solution is progressively increased to at least 6%. The purpose of this procedure is to also reduce osmotic shock.

The resin is treated with the defouling solution for at least 8 hours, and preferably at least 24 hours. This can be effected by soaking the resin in the defouling solution in a holding tank for at least 8 hours, and preferably for at least 24 hours.

The treatment preferably occurs at an elevated temperature of at least about 40° C. but at a temperature less than that which would degrade the anion exchange resin, i.e., typically no more than about 60° C. More preferably, the treatment occurs at an elevated temperature of about 50° to about 60° C. To avoid osmotic shock to the exchange resin, preferably the resin is slowly heated to the elevated temperature such as by contacting it with hot water. Thus before the resin is treated with the defouling solution, it is preferably first preheated to a temperature from about 40° to about 60° C. More preferably, the resin is first preheated to a temperature of about 50° to about 60° C.

After the anion exchange resin is defouled, it can be rinsed with water to remove the ammonium sulfate, and can then be regenerated such as by contacting it with a regeneration solution containing sodium hydroxide. The regenerated anion exchange resin should also be rinsed with water to remove the sodium hydroxide. To avoid osmotic shock, the regenerating solution and the water employed in the preregeneration step rinse preferably have a temperature of from about 40° to about 60° C. and, more preferably, from about 50° to about 60° C.

This process has significant advantages. It effectively and economically removes organic foulants from the anion exchange resin. Moreover, it makes use of reagents, namely ammonium sulfate and sodium hydroxide, that are commonly available at power plants. For example, ammonium sulfate is available because it is used for regenerating water polishers as described in our U.S. Pat. No. 4,511,675, which is incorporated herein by this reference.

DRAWINGS

These and other features, aspects, and advantages of the present invention will become better understood with reference to the following description, appended claims, and accompanying drawing which schematically shows the steps of a preferred process embodying features of the present invention.

DESCRIPTION

This invention is directed to a method for removing organic foulants from an anion exchange resin. A typical anion exchange resin has immobile cationic sites to which are attached mobile i.e., exchangeable) hydroxide anions. In accordance with the method of the present invention, the anion exchange resin is treated with a defouling solution comprising at least about 6% ammonium sulfate (wt/wt sulfate) As used herein, "% ammonium sulfate (wt/wt sulfate)" means the weight of the sulfate moiety of the ammonium sulfate per weight of the solution times 100.

Below about 6% ammonium sulfate (wt/wt sulfate), the defouling solution does not significantly displace the organic foulants present on the anion exchange resin. Organic foulants include, but are not limited to, organic sulfonates bonded to the anion resin. Conversely, to avoid having the anion resin float on top of the defouling solution and the loss of anion resin caused by such floating, it is preferred that the defouling solution have a density less than the density of the anion resin. A defouling solution comprising less than about 15% ammonium sulfate wt/wt sulfate) has a density less than the density of typical anion resins. An exemplary defouling solution comprises about 10% ammonium sulfate (wt/wt sulfate). The actual amount of ammonium sulfate employed in the defouling solution per cubic foot of resin can vary. An exemplary amount of ammonium sulfate (as sulfate) employed per cubic foot of resin is about 13 pounds of ammonium sulfate (as sulfate)". As used herein, "pounds of ammonium sulfate as sulfate)" means the weight, in pounds, of the sulfate moiety of ammonium sulfate.

The pH of the defouling solution is preferably from at least about 4 to less than about 10. Below a pH of about 4, any silica contaminants present in the anion resin can polymerize and foul the resin. Prolonged contact of the anion resin with a hot solution having a pH greater than 10 increases the probability of destroying strong base sites on the anion resin. The pH of the defouling solution is preferably from about 7 to less than about 10 and optimally from about 9 to less than about 10. By maintaining the pH of the defouling solution in these narrower ranges, the probability of the anion resin undergoing osmotic shock due to changes in the pH of the anion resin is reduced. Osmotic shock produces a deterioration or physical breakdown of the anion resin due to a change in the anion resin's environment brought about by a change in pH, temperature, ionic concentration, or other environmental parameters.

The anion resin is soaked in the defouling solution for a period of at least about 8 hours. The soaking period allows the ammonium sulfate to treat the organic foulants deep within the anion resin beads. Periods below about 8 hours are not, in general, sufficiently long to enable the organic foulants to be completely displaced and to diffuse from the anion resin. An exemplary soaking period is at least about 24 hours.

In order to expedite the displacement of the organic foulants from the anion resin, it is preferred that the defouling solution have an elevated temperature. Preferably, the defouling solution has a temperature of about 40° to about 60° C. A defouling solution having a temperature below about 40° C. requires an excessively long soaking period whereas a defouling solution having a temperature in excess of about 60° C. is prone to adversely affect strong base exchange sites on the anion resin. More preferably, the defouling solution has a temperature of about 50° to about 60° C. An exemplary defouling solution has a temperature of about 55° C. To maintain the temperature of the defouling solution at a desired level, a portion of the partially cooled defouling solution can be drained from the anion resin and either reheated or replaced with a hot solution of ammonium sulfate.

During the soaking cycle, the percent of ammonium sulfate in the defouling solution can decrease. This decrease may be due, in part, to the absorption of the sulfate onto the anion resin. Optionally, this decrease in the defouling solution's ammonium sulfate concentration can be compensated for in a manner similar to that discussed above, namely, by replacing a portion of the partially depleted defouling solution with a solution having an ammonium sulfate concentration sufficient to adjust the defouling solution's ammonium sulfate concentration to the desired level.

Optionally, the defouling solution comprises ingredients in addition to the ammonium sulfate. For example, the defouling solution can also contain an alkali metal hydroxide (e.g., sodium hydroxide, potassium hydroxide, lithium hydroxide, and mixtures of thereof), an amine (e.g., morpholine, cyclohexamine, and mixtures thereof), and mixtures thereof to aid in adjusting the defouling solution's pH. Because of its low cost and availability, sodium hydroxide is preferably used to aid in adjusting the pH of the defouling solution. A suitable amount of sodium hydroxide for this purpose is about one weight percent of the defouling solution.

Several precautions can optionally be taken to avoid subjecting the anion resin to osmotic shock. One precaution is to preheat the anion resin prior to soaking the anion resin in the heated defouling solution. The initial temperature of the anion resin depends upon the environment where the anion resin is located and is typically from about 20° to about 30° C. The preheating procedure comprises slowly heating the anion resin from its initial temperature to the temperature of the defouling solution. The period of time required to accomplish this preheating step varies. An exemplary period of time is from about 0.5 to about 2 hours. In general, a period of about 1 hour is satisfactory.

In another optional precautionary procedure, the anion resin is initially contacted with a pretreatment solution having an ammonium sulfate concentration less than the ammonium sulfate concentration of the defouling solution. In one version of this procedure, the ammonium sulfate concentration of the pretreatment solution is gradually raised until its ammonium sulfate concentration reaches that of the defouling solution. For example, the initial ammonium sulfate solution can comprise less than 3% ammonium sulfate (wt/wt sulfate). A pretreatment solution having an initial ammonium sulfate concentration of about 2% ammonium sulfate (wt/wt sulfate) has been used satisfactorily. This ammonium sulfate pretreatment step is conducted for a suitable length of time, e.g., for about 0.5 to about 1 hour. The ammonium sulfate pretreatment step also serves to strip chloride ions from the anion resin and thereby decreases the amount of ammonium sulfate per cubic foot of resin required in the defouling solution to remove the more tenacious organic foulants from the anion resin. The amount of ammonium sulfate necessary to remove or exhaust the chloride from the anion resin is directly proportional to the concentration and flow rate of the pretreatment solution through the anion resin. An exemplary amount of ammonium sulfate (as sulfate) used in the pretreatment step is about 7 to about 8 pounds per cubic foot of resin.

In an alternative ammonium sulfate pretreatment procedure, the anion resin is treated with a pretreatment solution having a substantially constant ammonium sulfate concentration that is less than the ammonium sulfate concentration of the defouling solution. For example, the anion resin can be treated with a pretreatment solution containing about 2% ammonium sulfate (wt/wt sulfate) until the anion resin is exhausted to sulfate. This pretreatment procedure also takes about 0.5 to about 1 hour to complete. After chloride and other inorganic ions are substantially removed from the anion resin, the anion resin can be immediately contacted with the defouling solution. However, in order to avoid osmotic shock, it is preferred to contact the anion resin with at least one additional pretreatment solution, e.g., a pretreatment solution comprising about 5% ammonium sulfate (wt/wt sulfate).

The preheating and pretreatment steps are conducted in any order or simultaneously. However, because the simultaneous variation of more than one variable increases the probability of subjecting the anion resin to osmotic shock, preferably only one pretreatment step is conducted at a time.

After the anion resin has been treated with the defouling solution, the defouling solution is displaced with deionized water. An exemplary amount of deionized water is about one to one and a half bed volumes. The anion resin is then rinsed with deionized water until the effluent has a conductivity of less than about 1,000, and preferably less than about 100 micromhos/cm. The rinse water can be passed through the anion resin tank at varying rates. However, because channeling substantially reduces the efficiency of the rinse water in removing ammonium sulfate from the anion resin, the rate of water through the anion resin tank is preferably adjusted such that channeling does not occur in the anion resin. An exemplary water flow rate through the anion resin tank is about 1 to about 1.5 gallons per minute per cubic foot of resin.

To avoid subjecting the anion resin to osmotic shock, the water employed in the displacement and rinse steps preferably has a temperature of about 40° to about 60° C. and, more preferably, about 50° to about 60° C. However, when regeneration of the anion resin with a strongly basic solution is to be either delayed or performed with a regeneration solution that is not heated, the water used in the rinse step need not be heated.

After the desired effluent purity has been obtained, the anion resin is regenerated with the strongly basic alkali solution. An exemplary strongly basic alkali is sodium hydroxide. A sodium hydroxide solution employs about 4% to about 10%, and preferably about 8%, by weight sodium hydroxide. In terms of pounds per cubic foot of resin, the sodium hydroxide solution preferably employs about 10 to about 20 pounds of sodium hydroxide per cubic foot of resin. An exemplary flow rate of the alkali solution is about 0.25 to about 0.5 gallon per minute per cubic foot ($gpm/ft^3$) of anion resin. About five bed volumes of alkali solution are used. The regeneration procedure typically takes from about 60 to about 90 minutes.

In order to expedite the regeneration of the anion resin, it is preferred that the strongly basic alkali solution have a temperature of from about 40° to about 60° C. More preferably, the strongly basic alkali solution has a temperature of about 50° to about 60° C. Accordingly, if the anion resin has cooled prior to the regeneration procedure, the anion resin is preferably reheated to a corresponding elevated temperature.

After the regeneration procedure, the regenerant is displaced with about one bed volume of deionized water at the same flow rate used during regeneration. The resin is then rinsed with deionized water at a rate of about 1 to about 1.5 $gpm/ft^3$ of anion resin until the effluent has a conductivity of less than about 5 micromhos/cm at 25° C. A typical rinse volume is about ten bed volumes.

To avoid subjecting the anion resin to osmotic shock, the water employed in the displacement step preferably also has a temperature of about 40° to about 60° C. and, more preferably, about 50° to about 60° C. However, for economic reasons, the water employed in the subsequent rinse step need not be heated The process of the present invention ca be used for all types of resins including macroporous and gel resins. With reference to FIG. 1, the steps of the preferred version of the present invention are as follows:

STEP 1

In the hot water pretreatment procedure 10, water, having an initial temperature of about 20° to about 30° C., is passed through the anion resin tank (ART). The temperature of the water is gradually raised until the water entering and exiting the ART has a temperature of about 55° C. The water employed in this pretreatment step is preferably demineralized water to avoid introducing anions or foulants into the ART.

STEP 2

In the ammonium sulfate pretreatment procedure 12, ammonium sulfate is introduced into the ART. The ammonium sulfate is introduced as a solution produced by combining concentrated sulfuric acid and dilution water to produce a sulfuric acid solution which is then mixed with either concentrated or dilute ammonia. To avoid subjecting the anion resin to osmotic shock, the ammonium sulfate solution initially contains about 2% ammonium sulfate wt/wt sulfate). The ammonium sulfate concentration is gradually increased to about 10% (wt/wt sulfate) over a period of about 0.5 to about one hour. This increase in ammonium sulfate concentration is accomplished by increasing the amounts of ammonia and sulfuric acid with respect to the amount of dilution water being introduced into the ART. At all times, the pH of the ammonium sulfate solution is alkaline. In order to maintain the ammonium sulfate solution at an alkaline pH, the ammonia and sulfuric acid flow rates are increased in a stepped fashion by first increasing the flow rate of the ammonia stream and then increasing the flow rate of the sulfuric acid stream.

STEP 3

In the soaking procedure 14, the anion resin soaks in the 10% ammonium sulfate (wt/wt sulfate) solution for about 24 hours in the ART. Periodically, a hot solution of ammonium sulfate can be is introduced into the ART to maintain the temperature of the ammonium sulfate solution at about 50° C. The amount of the ammonium sulfate (as sulfate) used is about 13 pounds per cubic foot of anion resin.

STEP 4

In the rinse procedure 16, heated rinse water is passed through the ART in order to remove the ammonium sulfate from the soaked anion resin. To avoid recontaminating the clean anion resin, the water applied in rinse procedure 16 preferably is demineralized water. The rinse procedure 16 is continued until the effluent from the ART has a conductivity of less than 100 micromhos/cm.

STEP 5

In the regeneration procedure 18, the anion resin is regenerated by passing about five bed volumes of about a 2N sodium hydroxide solution through the rinsed anion resin. The solution has a temperature of about 50° to about 55°.

STEP 6

In the final rinse procedure 20, the regenerant solution is displaced with about one bed volume of deionized water having a temperature of about 50° to about 55° C. and then the anion resin is rinsed with about ten bed volumes of ambient temperature deionized water until the conductivity is less than about 5 micromhos/cm at 25° C.

By employing the method of the present invention the longevity of the anion resin is prolonged by removing the organic foulants from the anion resin without introducing additional contaminants such as those found in commercial rinses using surfactants. Accordingly, the anion resins treated by the method of the present invention do not have to be thrown out as is the present case when an anion resin is contaminated with an organic foulant.

EXAMPLES

The following examples compare a process within the scope of the present invention with a prior art technique for regenerating anion resins.

EXAMPLES 1-3

Prior Art Ammonium Sulfate Treatment

The following protocol was employed in this procedure:

A. Resin Separation

A mixed resin sample was taken from three polisher beds identified herein as A, B, and C) at Southern California Edison's Mohave Generating Station. At least about 200 ml. each of cation and anion resin were separated from each mixed bed resin sample. These aliquots are identified as anion resin A, cation resin A, anion resin B, etc.

B. Anion Resin Regeneration

The anion resin aliquots A, B, and C were each regenerated as follows:

1. About 200 ml of wet anion resin was placed in a 40 mm inner diameter, fritted-disc chromatograph column.
2. An ammonium sulfate solution (about 1% wt/wt sulfate; about 2.5 liters) was passed through the column over a 50 minute period at a flow rate of about 50 ml/min.
3. The resin was rinsed with deionized water at a flow rate of about 50 ml/min until the effluent conductivity was less than about 50 micromhos/cm at about 25° C.
4. About 1 liter of 1N sodium hydroxide at about 50° to about 55° C. was passed through the resin over a 90 minute period at a flow rate of about 11 ml/min.
5. The sodium hydroxide regenerant was displaced with about 200 ml of deionized water at a flow rate of about 11 ml/min.
6. The resin was rinsed with deionized water at about 50 ml/min. until the effluent conductivity was less than about 5 micromhos/cm at about 25° C.

C. Cation Resin Regeneration

The cation resin aliquots A, B, and C were each regenerated as follows:

Wet cation resin (about 200 ml) was placed in a 40 mm ID, fritted-disc chromatography column. Sulfuric acid about 1N, about 1 liter) was passed through the column over about a 90 minute period at a flow rate of about 11 ml/min. The sulfuric acid was displaced with about 200 ml of deionized water at a flow rate of about 11 ml/min. The resin was then rinsed with about 50 ml/min of deionized water until the effluent conductivity was less than about 50 micromhos/cm at about 25° C.

D. Test Column Preparation

Cation aliquots A, B, and C were recombined with their corresponding anion aliquots A, B, and C as follows:

Cation and anion resins about 50 ml each) were measured in separate graduated cylinders. Chromatography column having an inner diameter of about 20 mm were filled with deionized water. A core sample about 5 ml) of the anion resin was placed in the column. As the anion resin settled, a core sample (about 5 ml) of the cation resin was added to the column. After both resins settled, the resins were further mixed in the column. The sequence of steps was repeated until all the resin had been transferred to the column and mixed.

E. Flow Sensitivity Test

The following protocol was employed in order to test the performance of the cleaned and regenerated mixed bed polisher resin:

A sodium sulfate solution about 1 liter) having a conductivity of about 60 micromhos/cm was passed through the column at a flow rate of about 20 gallons per minute per square foot of resin. After about 800 ml of the sodium sulfate solution passed through the column, the conductivity of the effluent was monitored. The conductivity, which was recorded at the end of the run is set forth in Table I.

EXAMPLES 4-6

Ammonium Sulfate Treatment of Present Invention

At least about 200 ml each of the cation and anion resin were also separated from each mixed bed resin sample A, B, and C taken from the Mohave Generating Station. These mixed bed resin samples A-C were also subjected to the same treatment steps set forth in Examples 1-3 with the following modifications. After step 2 and before step 3 of the Anion Resin Regeneration procedure, the anion resin from aliquots A-C were subjected to the following additional step:

2(a) The anion resin was removed from the column and placed in a glass bottle. For every 100 ml of anion resin placed in the glass bottle, 100 grams of a 10% ammonium sulfate solution (weight of solute as sulfate per unit weight of solvent) was added to the bottle. The bottle was then sealed and heated to about 50° C. for about 18 hours with occasional stirring. After this heating procedure, the 10% ammonium sulfate solution (wt/wt sulfate) was drained from the bottle and the cleaned resin was replaced in the column.

The conductivity of the effluent measured for each cleaned and regenerated resin of Examples 4-6 is also set forth in Table I. Table I shows that an exemplary process of the present invention for cleaning the anion resin reduces the effluent conductivity of an anion resin regenerated by a prior art process by 21 to 41%.

TABLE I

| Example | Resin Sample | Effluent Conductivity, micromhos/cm | | Improvement $\frac{x - y}{x}$ (100%) |
|---|---|---|---|---|
| | | Resin Regenerated by Prior Art Process, x | Resin Regenerated by Exemplary Process of Present Invention, y | |
| 1 | A | 1.11 | | |
| 4 | A | | 0.650 | 41% |
| 2 | B | 1.40 | | |
| 5 | B | | 1.08 | 23% |
| 3 | C | 0.610 | | |
| 6 | C | | 0.481 | 21% |

EXAMPLE 7

The following example demonstrates a field test of an exemplary process of the present invention.

The water content of a steam generator was measured and 100 parts per billion ppb) sulfate were present. The cation and anion resins present in the mixed resin polisher bed treating water prior to the water entering the steam generator were separated and the anion resin was cleaned and regenerated with the following procedure:

Warm water was passed through the anion resin until the effluent water from the anion resin tank was above about 50° C. An ammonium sulfate solution was then introduced into the anion resin tank. The concentration of ammonium sulfate was increased until about a 2% ammonium sulfate (wt/wt sulfate) solution was reached. The ammonium sulfate solution temperature was maintained below about 60° C. and the pH was maintained above about 7. The concentration of the ammonium sulfate solution was gradually increased until a 10% ammonium sulfate solution (wt/wt sulfate) was obtained. At this point the anion resin was allowed to soak in the 10% ammonium sulfate solution (wt/wt sulfate) for a minimum of about 24 hours. After the soak procedure, the anion resin was then hot water rinsed, regenerated, rinsed again, and recombined with the cation resin in the mixed resin tank. The beds of cleaned resin were then transferred to service vessels.

After this anion resin cleaning and regeneration procedure, the polishers were placed back in service. The water in the steam generator was again assayed and found to contain about 5 ppb sulfate. Since the anion resin has very little sulfonate capacity and since sulfonates break down in the steam generator to sulfates, this example demonstrates that sulfonates on the anion resin were effectively removed and that the anion resin is again capable of absorbing sulfonate contaminants.

Accordingly, the process of the present invention has significant advantages. First it effectively and economically removes organic foulants from anion exchange resin. Second, anion resins fouled with organic foulants no longer need to be discarded. This is a significant cost saving since anion exchange resins can cost as much as $200 per cubic foot. In addition, the process of this invention makes use of reagents (ammonium hydroxide and sulfuric acid to produce ammonium sulfate and sodium hydroxide) that are readily available at power plants.

Although the present invention has been described in considerable detail with reference to certain preferred versions thereof, other versions are possible. For example, an alternative procedure for making the ammonium sulfate solution employed in the present invention comprises mixing ammonium sulfate salt with water. Therefore, the spirit and scope of the appended claims should not necessarily be limited to the description of preferred versions contained herein.

What is claimed is:

1. A method for removing organic foulants, including organic sulfonates, from an organically fouled anion exchange resin comprising the steps of:
   (a) introducing a defouling solution comprising a defoulant, the defoulant consisting essentially of ammonium sulphate in an amount of at least about 6% (wt/wt sulfate), into an anion exchange resin treatment zone comprising the organically fouled anion exchange resin, the organically fouled anion exchange resin having a first organic foulant, including organic sulfonate, content;
   (b) soaking the anion exchange resin in the defouling solution for at least about 8 hours to remove organic foulants, including organic sulfonates from the anion exchange resin; and
   (c) displacing the defouling solution from the anion exchange resin in the treatment zone to yield a treated anion exchange resin having a second organic foulant, including organic sulfonate content, the second organic foulant, including organic slfonate content being less than the first organic foulant, including organic sulfonate, content, wherein the defouling solution has a pH from at least about 4 to less than about 10.

2. The method of claim 1 wherein the defouling solution comprises from about 6 to about 15% ammonium sulfate (wt/wt sulfate).

3. The method of claim 1 wherein the defouling solution has a pH of from about 7 to less than about 10.

4. The method of claim 1 wherein the defouling solution has a pH of about 9 to less than about 10.

5. The method of claim 1 in which the step of soaking comprises soaking the anion exchange resin for at least about 24 hours in the defouling solution.

6. The method of claim 1 wherein the introduced defouling solution has a temperature of at least about 40° C.

7. The method of claim 1 wherein the introduced defouling solution has a temperature of about 40° C. to about 60° C.

8. The method of claim 1 further comprising the step of regenerating the treated anion exchange resin by contacting the treated anion exchange resin with an aqueous solution of sodium hydroxide.

9. The method of claim 1 in which the step of introducing the defouling solution into the anion exchange resin treatment zone further comprises initially introducing a defouling solution containing less than 6% ammonium sulfate (wt/wt sulfate) into the anion exchange resin treatment zone and then progressively increasing the ammonium sulfate content of the defouling solution to at least 6% to avoid osmotic shock to the anion exchange resin.

10. The method of claim 1 in which the anion exchange resin is used for polishing condensate water in a power plant.

11. The method of claim 1 wherein before the defouling solution is introduced into the anion exchange resin treatment zone, the organically fouled anion exchange resin is heated to at least about 40° C. to avoid osmotic shock.

12. The method of claim 1 wherein the defouling solution further comprises a composition selected from the group consisting of alkali metal hydroxides, amines, and mixtures thereof to aid in adjusting the pH of the defouling solution.

13. A method for removing organic foulants, including organic sulfonates, from an organically fouled anion exchange resin, comprising the steps of:
(a) heating the organically fouled anion exchange resin to at least about 40°0 C., the organically fouled anion exchange resin being present in an anion exchange resin treatment zone and having a first organic foulant, including organic sulfonate, content;
(b) treating the heated anion exchange resin with an alkaline defouling solution comprising a defoulant, the defoulant consisting essentially of ammonium sulfate, in an amount of at least about 6% (wt/wt sulfate), the treating including the step of:
  (i) introducing an alkaline defouling solution having a temperature of at least about 40° C. and comprising less than 3% ammonium sulfate (wt/wt sulfate) into the anion exchange resin treatment zone, and then progressively increasing the ammonium sulfate content of the defouling solution to at least about 6% ammonium sulfate (wt/wt sulfate);
(c) soaking the anion exchange resin for at least about 8 hours in the defouling solution to remove organic foulants, including organic sulfonates, from the anion exchange resin, the defouling solution comprising a defoulant, the defoulant consisting essentially of ammonium sulfate in an amount of at least about 6% (wt/wt sulfate)
(d) displacing the defouling solution from the anion exchange resin in the treatment zone with water for removing ammonium sulfate therefrom and to yield a treated anion exchange resin having a second organic foulant, including organic sulfonate content, the second organic foulant, including organic sulfonate, content being less than the first organic foulant, including organic sulfonate, content; and
(e) regenerating the treated anion exchange resin with a solution containing sodium hydroxide, wherein the defouling solution has a pH from at least about 4 to less than about 10.

14. The method of claim 13 wherein the temperature of the defouling solution in step (c) is maintained at at least about 40° C.

15. The method of claim 13 wherein the water employed in step d has a temperature of at least about 40° C.

16. The method of claim 13 wherein the sodium hydroxide solution has a temperature of at least about 40° C.

17. The method of claim 13 wherein after step (e) the regenerated anion exchange resin is rinsed with water for removing sodium hydroxide.

18. The method of claim 13 wherein after step (e) the resin is used for polishing condensate water in a power plant.

* * * * *